United States Patent
Wakumoto et al.

(10) Patent No.: US 7,656,790 B2
(45) Date of Patent: Feb. 2, 2010

(54) HANDLING LINK FAILURES WITH RE-TAGGING

(75) Inventors: Shaun Kazuo Wakumoto, Roseville, CA (US); Ballard Claude Bare, Auburn, CA (US); Cetin Ersoy, Portsmouth, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 949 days.

(21) Appl. No.: 10/878,143

(22) Filed: Jun. 28, 2004

(65) Prior Publication Data

US 2005/0286413 A1 Dec. 29, 2005

(51) Int. Cl.
*H04L 12/26* (2006.01)
*H04L 12/28* (2006.01)

(52) U.S. Cl. .................. 370/221; 370/252; 370/392; 370/400

(58) Field of Classification Search ......... 370/216–219, 370/222, 224, 225, 228, 254–258, 389, 400–408; 379/112.04; 709/249
See application file for complete search history.

(56) References Cited

U.S. PATENT DOCUMENTS

| 6,493,318 | B1 | 12/2002 | Bare | |
|---|---|---|---|---|
| 6,577,600 | B1 | 6/2003 | Bare | |
| 6,580,715 | B1 | 6/2003 | Bare | |
| 6,963,575 | B1* | 11/2005 | Sistanizadeh et al. | 370/404 |
| 7,133,358 | B2* | 11/2006 | Kano | 370/221 |
| 2002/0083174 | A1* | 6/2002 | Hayashi et al. | 709/225 |
| 2004/0190446 | A1* | 9/2004 | Ansorge et al. | 370/228 |
| 2005/0286411 | A1* | 12/2005 | Alicherry et al. | 370/216 |

* cited by examiner

*Primary Examiner*—Seema S Rao
*Assistant Examiner*—Wanda Z Russell (57) ABSTRACT

One embodiment disclosed relates to a method of handling link failures between switches. A failed link is detected at a detecting switch. The detecting switch determines a set of path tags whose paths are affected by the failed link. Subsequently, when packets are received with one of the path tags affected by the failed link, those packets are retagged with a detour path tag associated with a detour path circumventing the failed link. Another embodiment disclosed relates to a packet switch apparatus with link failure handling capability for use in a switching mesh. Another embodiment disclosed relates to a switching mesh including a capability to handle link failures.

22 Claims, 10 Drawing Sheets

FIG. 1
(Conventional)

FIG. 2
(Conventional)

FIG. 3
(Conventional)

HANDLING LINK FAILURES WITH RE-TAGGING

BACKGROUND OF THE INVENTION

1. Field of the Invention

The present invention relates generally to communication networks. More specifically, the present invention relates to network switches and switch-to-switch protocols.

2. Description of the Background Art

It is common in conventional computing environments to connect a plurality of computing systems and devices through a communication medium often referred to as a network. Such networks among communicating devices permit devices (or users of devices) to easily exchange and share information among the various devices. The Internet is a presently popular example of such networking on a global scale. Individual users attach their computers to the Internet, thereby enabling sharing of vast quantities of data on other computers geographically dispersed throughout the world.

Networked computing systems may be configured and graphically depicted in a wide variety of common topologies. In other words, the particular configurations of network communication links (also referred to as paths) and devices between a particular pair of devices wishing to exchange information may be widely varied. Any particular connection between two computers attached to a network may be direct or may pass through a large number of intermediate devices in the network. In addition, there may be a plurality of alternative paths through the network connecting any two network devices. Computing networks are therefore complex and vary in their configurations and topologies.

Certain network communication media and protocols are referred to as packet oriented. A protocol or communication medium may be said to be packet oriented in that information to be exchanged over the network is broken into discrete sized packets of information. A block of information to be transferred over the network is decomposed into one or more packets for purposes of transmission over the network. At the receiving end of the network transmission, the packets are re-assembled into the original block of data.

In general, each packet includes embedded control and addressing information that identifies the source device which originated the transmission of the packet and which identifies the destination device to which the packet is transmitted. Identification of source and destination devices is by means of an address associated with each device. An address is an identifier which is unique within the particular computing network to identify each device associated with the network. Such addresses may be unique to only a particular network environment (i.e., a network used to interconnect a single, self-contained computing environment) or may be generated and assigned to devices so as to be globally unique in co-operation with networking standards organizations.

At the lowest level of network communication, such addresses are often referred to as MAC address (Media ACcess address). Network protocols operable above this lowest level of communication may use other addresses for other purposes in the higher-level communication techniques.

In many conventional commercially-available network environments, the network communication medium is in essence a bus commonly attached to a plurality of devices over which the devices exchange. In a simple networking topology, all devices may be attached to such a bus-structured common network medium. Any particular single network medium has a maximum data exchange bandwidth associated therewith. The maximum data exchange bandwidth of a medium is determined by a number of electrical and physical properties of the medium and protocols used to communicate over that medium. For example, a popular family of related network media and protocols are collectively referred to as Ethernet. Ethernet defines a standard protocol for the exchange of messages over the communication medium. A variety of communication media are also defined as part of the Ethernet family. The communication bandwidth of the Ethernet family of standards may change over time, but conventionally ranges from approximately 10 Mbit (megabits or million bits of information) per second to 1 Gbit (gigabits or billion bits of information) per second. Therefore, a single (slow) Ethernet connection, for example, has a maximum data exchange bandwidth of approximately 10 Mbit per second.

In conventional network computing environments, a number of devices are used in addition to interconnected computing systems to efficiently transfer data over the network. Routers and switches are in general network devices which segregate information flows over various segments of a computer network. A segment, as used herein, is any subset of the network computing environment including devices and their respective interconnecting communication links. As noted above, a single computer network communication link has a maximum data transfer bandwidth parameter defining the maximum rate of information exchange over that network. Where all devices on a computer network share a common network medium, the maximum bandwidth of the computer network may be rapidly reached. The overall performance of the networked computing environment may be thereby reduced because information exchange requests may have to await completion of earlier information exchange requests presently utilizing the communication link.

It is often the case, however, that particular subsets of devices attached to the network have requirements for voluminous communication among members of the same subset but less of a requirement for information exchange with other devices outside their own subset. Though standard switch features generally do not include identifying such logical groupings of devices, some enhanced switching features do permit such logic to be performed within a switch device. For example, some enhanced switch features include the concept of defining and routing information based on virtual LAN (VLAN) definitions. In a VLAN, a group of devices may be defined as logically being isolated on a separate network although physically they are connected to a larger network of devices. VLAN features of enhanced switches are capable of recognizing such VLAN information and can route information appropriately so that devices in a particular VLAN are logically segregated from devices outside the VLAN.

For example, the financial department of a large corporation may have significant information exchange requirements within the financial department but comparatively insignificant needs for data exchange with other departments. Likewise, an engineering group may have significant needs for data exchange within members (computing systems and devices) of the same engineering group but not outside the engineering group. There may in fact be multiple of such subsets of devices in a typical computing network. It is therefore desirable to segregate such subsets of devices from one another so as to reduce the volume of information exchange applied to the various segments of the computer network.

In particular, a switch device is a device that filters out packets on the network destined for devices outside a defined subset (segment) and forwards information directed between computing devices on different segments of a networked computing environment. The filtering and forwarding of such information is based on configuration information within the switch that describes the data packets to be filtered and forwarded in terms of source and/or destination address information (once address locations are "learned" by the switch(es)).

Network switch devices and protocols associated therewith are also used to manage redundant paths between network devices. Where there is but a single path connecting two network devices, that single path, including all intermediate devices between the source and destination devices, represent a single point of failure in network communications between that source and destination device. It is therefore common in network computing environments to utilize a plurality of redundant paths to enhance reliability of the network. Having multiple paths between two devices enhances reliability of network communication between the devices by allowing for a redundant (backup) network path to be used between two devices when a primary path fails.

SUMMARY

One embodiment of the invention relates to a method of handling link failures between switches. A failed link is detected at a detecting switch. The detecting switch determines a set of path tags whose paths are affected by the failed link. Subsequently, when packets are received with one of the path tags affected by the failed link, those packets are retagged with a detour path tag associated with a detour path circumventing the failed link. The retagging may preferably be performed using hardware circuitry to advantageously provide very rapid failover and minimal packet loss.

Another embodiment relates to a packet switch apparatus with link failure handling capability for use in a switching mesh. The apparatus includes at least a plurality of ports and a switch controller coupled to the plurality of ports. The switch controller is configured to use procedures stored in memory to detect a failed link at a detecting switch, determine a set of path tags whose paths are affected by the failed link, receive a packet with one of the path tags affected by the failed link, and retag the packet with a detour path tag associated Another embodiment relates to a a switching mesh including a capability to handle link failures. Each switch in the mesh is configured to detect a failed link at a detecting switch, determine a set of path tags whose paths are affected by the failed link, receive a packet with one of the path tags affected by the failed link, and retag the packet with a detour path tag associated with a detour path circumventing the failed link.

DETAILED DESCRIPTION

A. Conventional Handling of Failed Links

Figure 1:
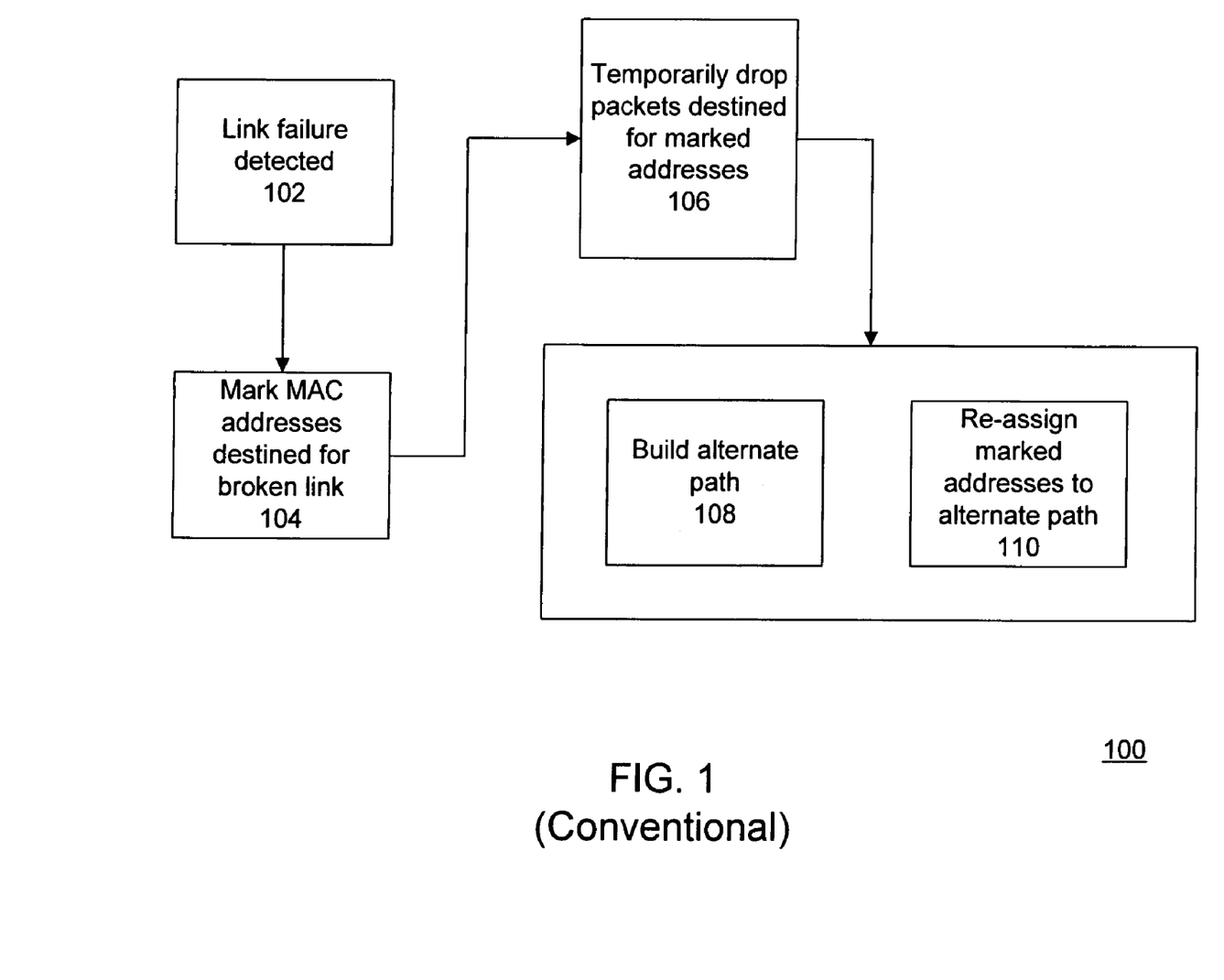
FIG. 1 is a flow chart depicting a conventional method of handling failed or broken links in a switching mesh.

FIG. 1 is a flow chart depicting a conventional method 100 of handling failed or broken links in a switching mesh. In this conventional method 100, a link failure is detected 102 by a detecting switch that would otherwise transmit packets by way of the broken link.

Figure 2:
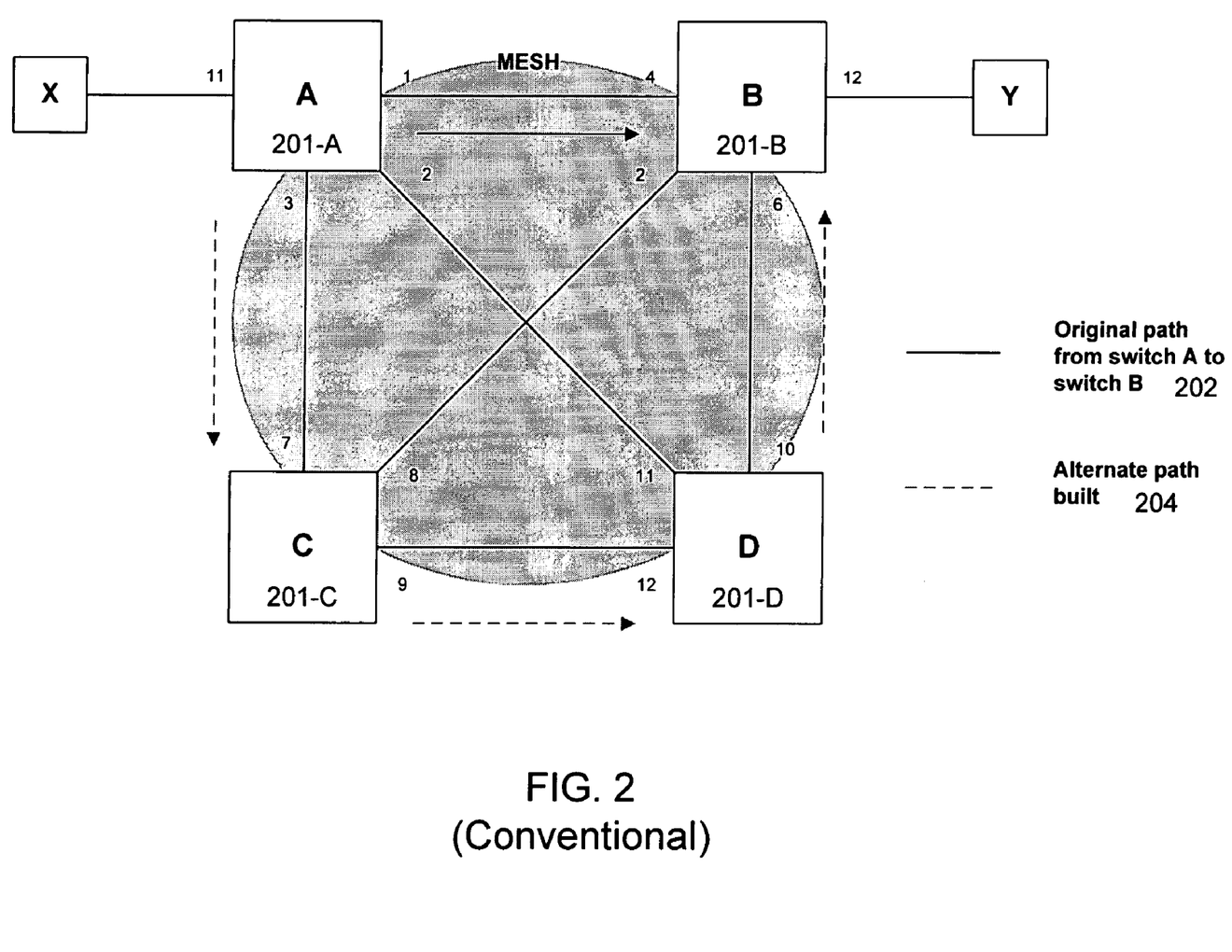
FIG. 2 is a schematic diagram of a switching mesh used in discussing the conventional method.

For purposes of illustration, consider the diagram of an example switching mesh in FIG. 2. Let us say that host X is communicating with host Y. Switch A 201-A has assigned the original path 202 from host X to host Y to traverse across the direct link that connects switch A, port 1 to switch B, port 4. Consider now that the link between switches A and B breaks. This link failure is detected 102 by switch A.

The detecting switch responds to the link failure, in part, by marking 104 the MAC addresses destined for the broken link. In the example discussed above in relation to FIG. 2, in response to the link failure, switch A 201-A marks 104 those addresses whose paths exit port 1 (and hence are headed towards the broken link). In a specific example, consider that switch A 201-A marks 104 the address for host Y, which is owned by switch B 201-B.

Packets received that are destined for the marked addresses are temporarily dropped 106 by the detecting switch. The dropping 106 typically occurs because the marked addresses are temporarily put into a bit bucket state. Packets destined to these bit-bucket-state addresses will be dropped in hardware circuitry by the detecting switch. In the example discussed above in relation to FIG. 2, switch A 201-A temporarily drops 106 packets destined for host Y.

The detecting switch also responds to the link failure by building 108 an alternate path to circumvent the failed link. In the example discussed above in relation to FIG. 2, the switch A 201-A builds 108 an alternate path 204 going from switch A 201-A, to switch C 201-C, to switch D 201-D, to switch B 201-B. Once the alternate path has been built (or as it is being built), the marked addresses are re-assigned 110 to that alternate path. In the example discussed above in relation to FIG. 2, switch A 201-A re-assigns the MAC address for host Y to the completed alternate path 204.

Unfortunately, the process of building 108 the alternate path and re-assigning 110 the marked addresses thereto is typically computationally intensive and a distributed effort. The process may take several seconds or more to complete, and there may be a large amount of packet loss during this period. An example of such a process is described further below in relation to FIG. 3 using the example discussed above in regards to FIG. 2.

Figure 3:
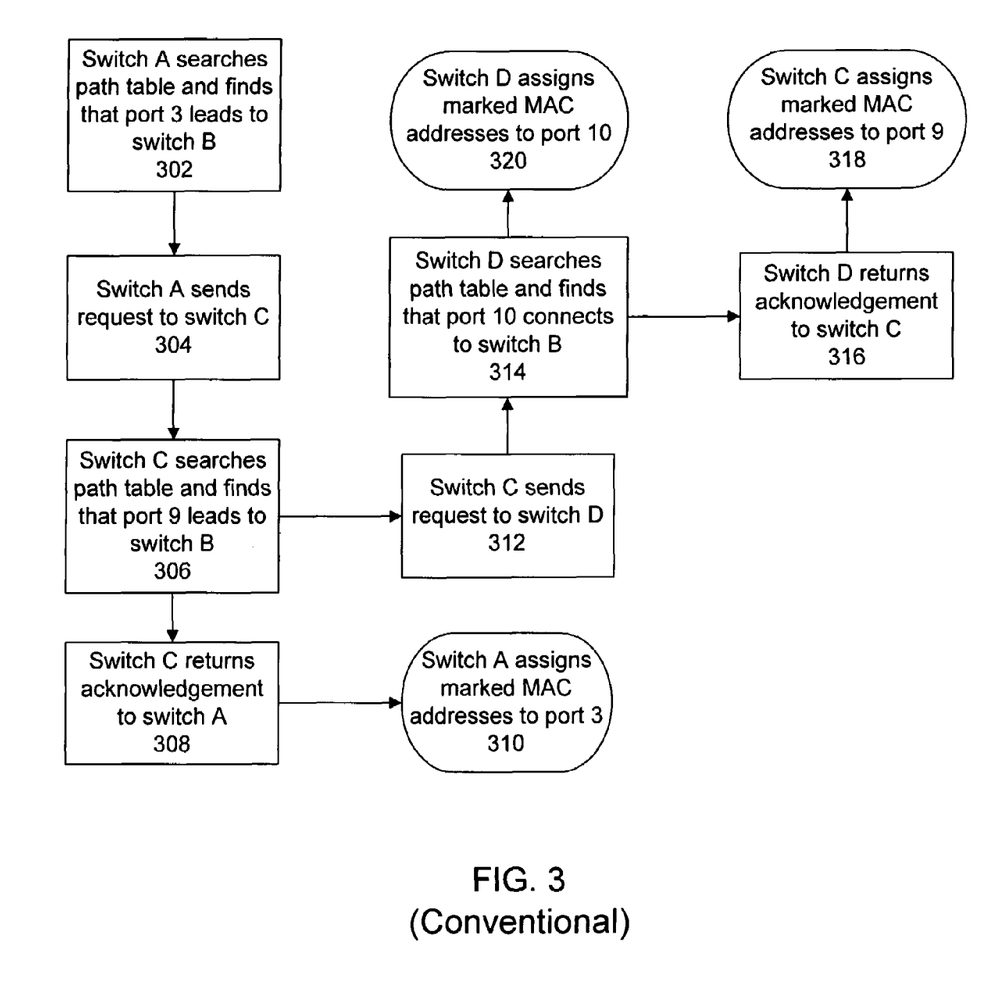
FIG. 3 is a flow chart depicting a procedure for building an alternate path in the conventional method.

In the example of FIG. 2, switch A needs an alternate path to switch B. The procedure may be as follows. Switch A searches 302 its path table, constructed by cost protocol packets, and finds that its port 3 also leads to switch B. Switch A then sends 304 a meshing query protocol packet via port 3 to switch C asking whether switch C has a path to switch B. Switch C searches 306 its path table and finds that its port 9 leads to switch B. Hence, switch C returns 308 a meshing query protocol acknowledgement packet via port 7 to switch A which indicates that switch C found a valid path to switch B, and switch A assigns 310 the marked MAC addresses (for instance, the MAC address for host Y) to port 3. In addition, since switch C does not have a direct path to switch B, switch C sends 312 a meshing query protocol packet via port 9 to switch D asking whether switch D has a path to switch B. Switch D searches 314 its path table and finds that its port 10 leads to switch B. Hence, switch D returns 316 a meshing query protocol acknowledgement packet via port 12 to switch C, and switch C assigns 318 the marked MAC addresses (for instance, the MAC address for host Y) to port 9. Finally, switch D is directly connected to switch B, and so switch B assigns 320 the marked MAC addresses to its port 10.

The above discussion in reference to FIG. 3 shows the tedious, error-prone, and slow nature of the procedure to move a MAC address to a newly built path. As the above discussion indicates, one disadvantageous aspect relates to the moving of MAC addresses across several switches. When MAC addresses are moved, the initiator switch communicates with its neighbor switches in order to find an alternate path. If the neighbor switch is not directly connected to the destination switch, then the neighbor switch also needs to search for a path to the destination switch.

B. Switching Mesh and Path Tagging

Figure 4:
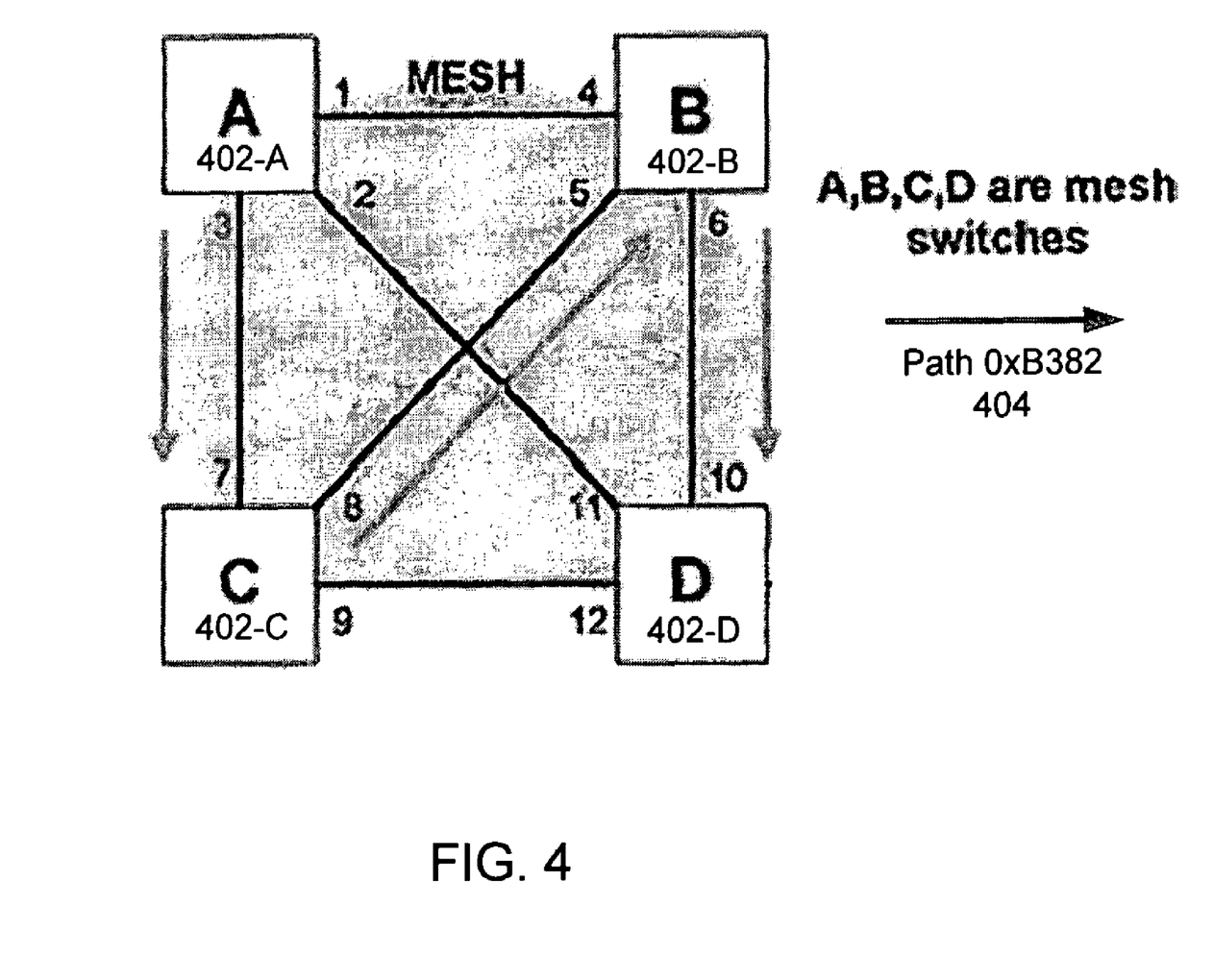
FIG. 4 is a schematic diagram depicting an exemplary switching mesh in accordance with an embodiment of the invention.

FIG. 4 is a schematic diagram depicting a switching mesh in accordance with an embodiment of the invention. One example path 404 is shown in FIG. 4. This path 404, designated in this instance as path 0xB382, travels as follows: exits port 3 of switch A 402-A; enters port 7 of switch C 402-C; exits port 8 of switch C 402-C; enters port 5 of switch B 402-B; exits port 6 of switch B 402-B; and enters port 10 of switch D 402-D.

In accordance with an embodiment of the invention, mesh tagging is utilized to advantageously identify paths within the mesh from a source switch to a destination switch. In one implementation, each source/destination pair may be configured with up to fifteen different paths. This is because four bits are used for the path identifier in a path tag and the zero value is considered invalid in this specific implementation. One example of such a path tag is described further below in relation to FIG. 5. Other embodiments may provide a different number of broadcast paths per switch by using a different number of bits for the path identifier. For example, if the path identifier has six bits, then each source/destination pair may be configured with sixty-three different paths.

Figure 5:
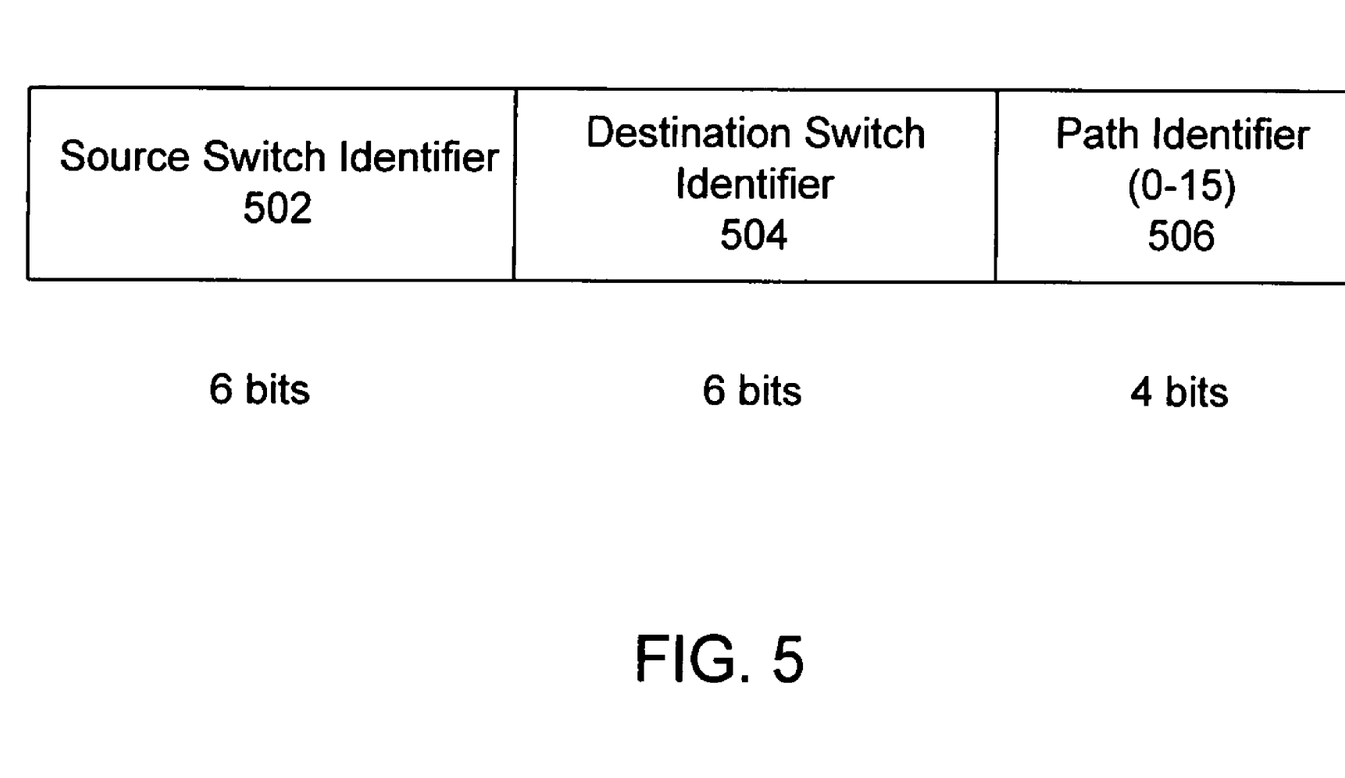
FIG. 5 is a diagram of a path tag in accordance with an embodiment of the invention.

FIG. 5 is a diagram of a path tag in accordance with an embodiment of the invention. The path tag includes a source switch identifier 502, a destination switch identifier 504, and a path identifier 506. The source switch identifier may also be called an owner switch identifier. In this embodiment, the path tag is sixteen bits in length. In particular, the source switch identifier 502 is six bits long, the destination switch identifier 504 is six bits long, and the path identifier 506 is four bits long. In this implementation, with the switch identifiers being six bits long, sixty-three different switches in the mesh may be distinguished and identified. (The value zero for the switch id being considered a reserved value in this implementation.) With the path identifier being four bits long, fifteen different paths may be identified per source/destination pair. (The value zero for the path id again being considered reserved in this implementation.) Other embodiments may have other lengths for these fields, resulting in different numbers of identifiable switches and paths.

Consider, for example, the mesh depicted in FIG. 4. Path tags of the format depicted in FIG. 5 may be used to identify different paths, for instance, from switch A to switch D. Given that source and destination, each path tag would include an identifier corresponding to switch A in the source switch identifier field 502 and an identifier corresponding to switch D in the destination switch identifier field 504. Distinctive path identifiers, one per path between A and D, would be included in the path identifier field 506.

For instance, a first path may go directly from A to D by exiting port 2 of switch A and entering port 11 of switch D. A second path may travel from A to D via switch C by exiting port 3 on switch A, entering port 7 of switch C, exiting port 9 of switch C, and entering port 12 of switch D. And so on for other possible paths. Each path is associated with a unique path identifier.

Consider the case where switch D learns a new MAC address and informs the rest of the mesh of the new MAC address associated with switch D. Switch A can then assign to that MAC address a path tag corresponding to one of the aforementioned paths from A to D (for example, path tag 0xB382 discussed above). Subsequently, every packet destined for that MAC address that enters switch A may be forwarded through the mesh based on that assigned path tag.

C. Example Packet Switch

Figure 6:
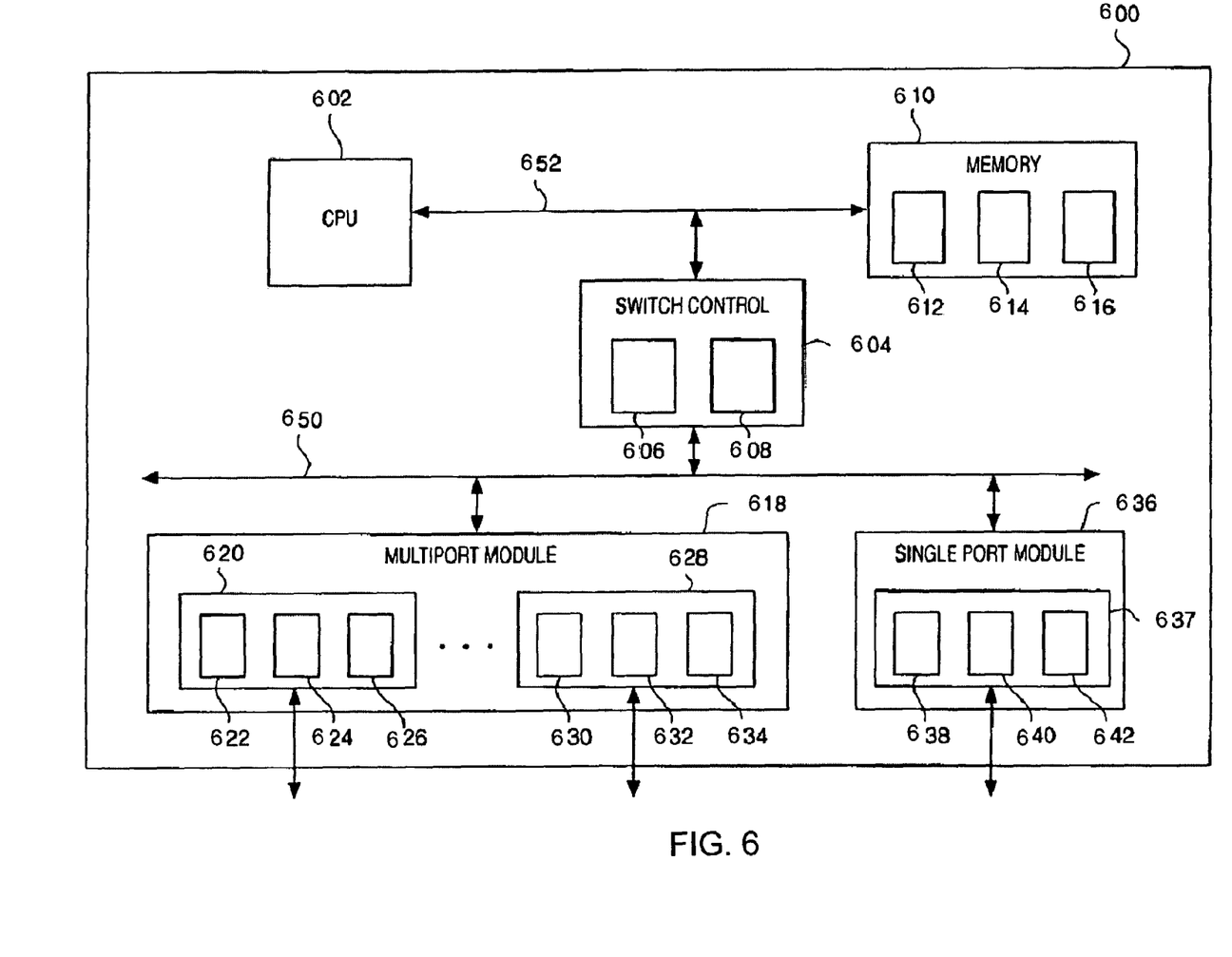
FIG. 6 is a schematic diagram of an example packet switch operable in accordance with an embodiment of the invention.

FIG. 6 is a schematic diagram of an example packet switch 600 operable in accordance with an embodiment of the invention. The specific configuration of packet switches used will vary depending on the specific implementation.

A central processing unit (CPU) 602 performs overall configuration and control of the switch 600 operation. The CPU 602 operates in cooperation with switch control 604, an application specific integrated circuit (ASIC) designed to assist CPU 602 in performing packet switching at high speeds required by modern networks.

The switch control 604 controls the "forwarding" of received packets to appropriate locations within the switch for further processing and/or for transmission out another switch port. Inbound and outbound high speed FIFOs (606 and 608, respectively) are included with the switch control 604 for exchanging data over switch bus 652 with port modules. In accordance with an embodiment of the invention, the switch control ASIC 604 is configured to insert, remove, and analyze a path tag within a fixed location in a packet.

Memory 610 includes a high and low priority inbound queue (612 and 614, respectively) and outbound queue 616. High priority inbound queue 612 is used to hold received switch control packets awaiting processing by CPU 602 while low priority inbound queue 614 holds other packets awaiting processing by CPU 602. Outbound queue 616 holds packets awaiting transmission to switch bus 620 via switch control 604 through its outbound FIFO 608. CPU 602, switch control 604 and memory 610 exchange information over processor bus 652 largely independent of activity on switch bus 620.

The ports of the switch may be embodied as plug-in modules that connect to switch bus 620. Each such module may be, for example, a multi-port module 618 having a plurality of ports in a single module or may be a single port module 636. A multi-port module provides an aggregate packet switch performance capable of handling a number of slower individual ports. For example, in one embodiment, both the single port module 636 and the multi-port module 618 may be configured to provide, for example, approximately 1 Gbit per second packet switching performance. The single port module 636 therefore can process packet switching on a single port at speeds up to 1 Gbit per second. The multi-port module 618 provides similar aggregate performance but distributes the bandwidth over, preferably, eight ports each operating at speeds, for example, of up to 100 Mbit per second.

Each port includes high speed FIFOs for exchanging data over its respective port. Specifically, each port, 620, 628, and 637, preferably includes an inbound FIFO 622, 630, and 638, respectively for receiving packets from the network medium connected to the port. Further, each port 620, 628, and 637, preferably includes a high priority outbound FIFO 624, 632, and 610, respectively, and a low priority outbound FIFO 626, 634, and 642, respectively. The low priority outbound FIFOs are used to queue data associated with transmission of normal packets while the high priority outbound FIFO is used to queue data associated with transmission of control packets. Each module (618 and 636) includes circuits (not specifically shown) to connect its port FIFOs to the switch bus 620.

As packets are received from a port, the packet data is applied to the switch bus 620 in such a manner as to permit monitoring of the packet data by switch control 604. In general, switch control 604 manages access to switch bus 620 by all port modules (i.e., 618 and 636). All port modules "listen" to packets as they are received and applied by a receiving port module to switch bus 620. If the packet is to be forwarded to another port, switch control 604 applies a trailer message to switch bus 620 following the end of the packet to identify which port should accept the received packet for forwarding to its associated network link.

D. Failed Link Recovery with Re-Tagging

Figure 7:
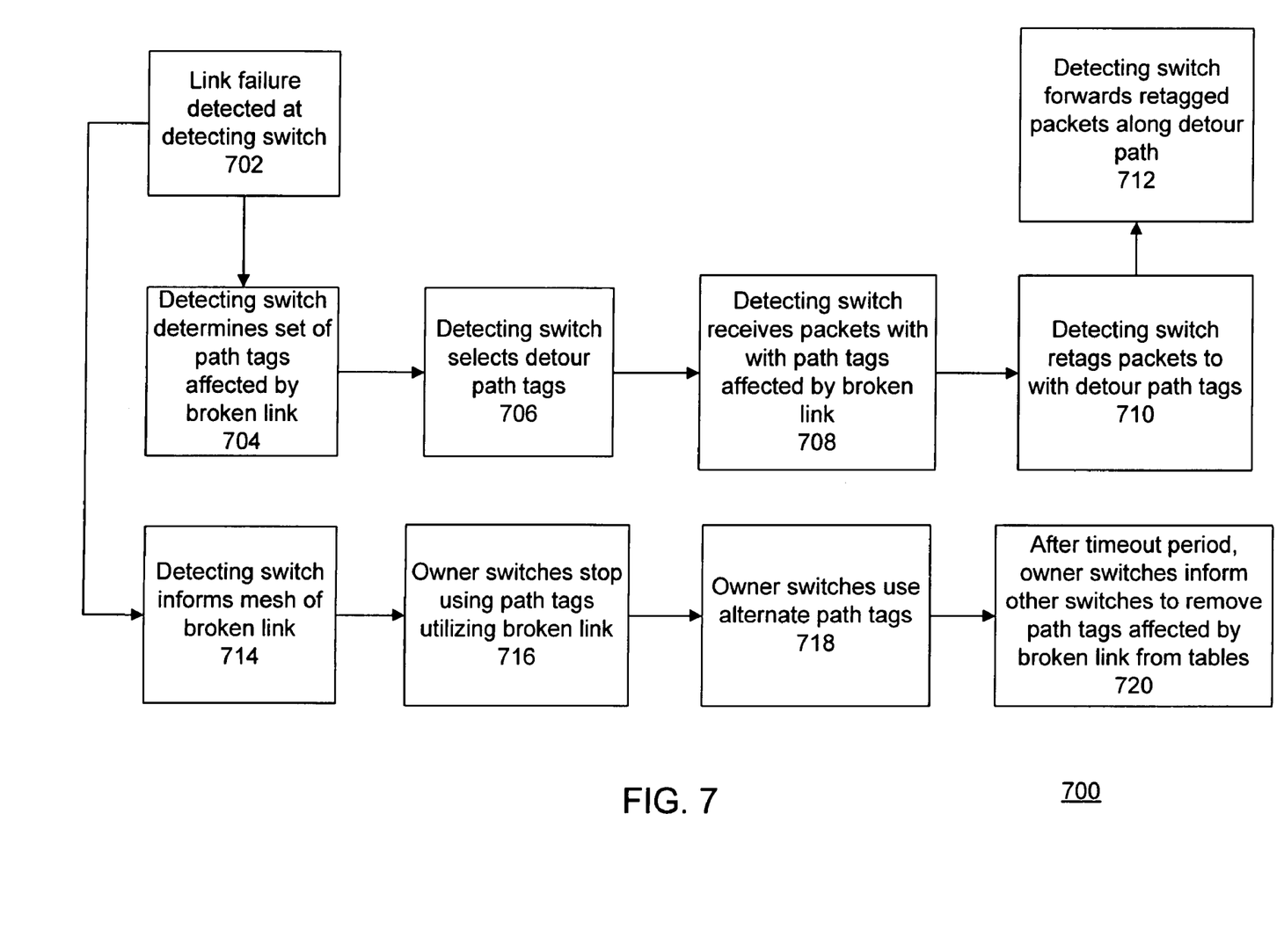
FIG. 7 is a flow chart depicting a method of failed link recovery in accordance with an embodiment of the invention.

FIG. 7 is a flow chart depicting a method 700 of handling failed links in a switching mesh in accordance with an embodiment of the invention. This technique differs substantially from the conventional technique. Advantageously, the technique of FIG. 7 avoids the temporary dropping of packets while an alternate path is built in the conventional technique. Instead, the mesh switch identifies a set of path tags affected by the broken link and uses retagging to avoid a need to temporarily drop packets.

As described above, by using mesh tagging (i.e. tags identifying different paths through the mesh), each switch may maintain a set of multiple paths to each of the other switches in the mesh. For example, in one implementation described above, each mesh switch may maintain a set of up to fifteen (15) identified paths to each of the other mesh switches.

Figure 8:
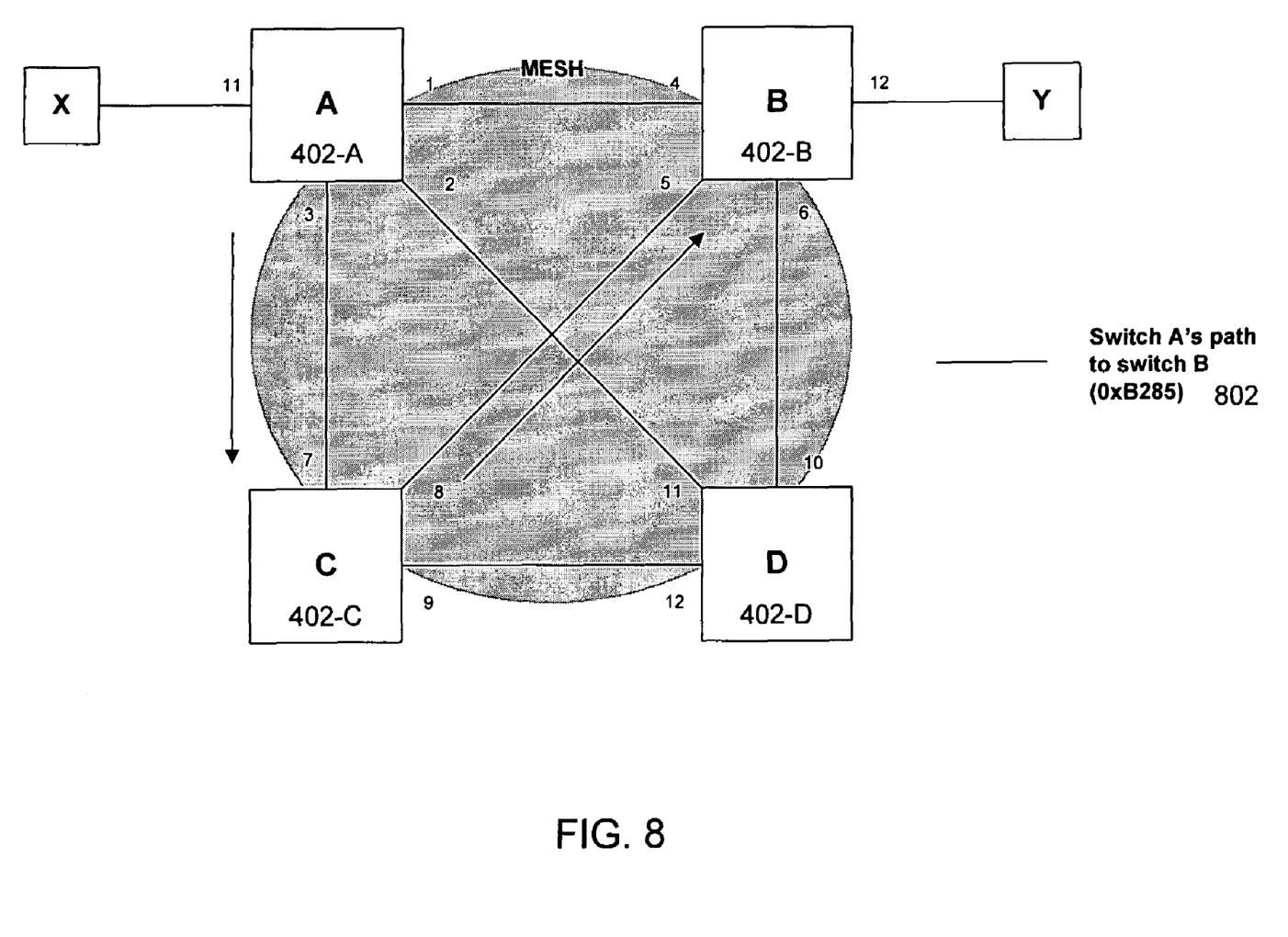
FIGS. 8, 9 and 10 depict an exemplary switching mesh used to discuss the method of failed link recovery in accordance with an embodiment of the invention.
Figure 9:
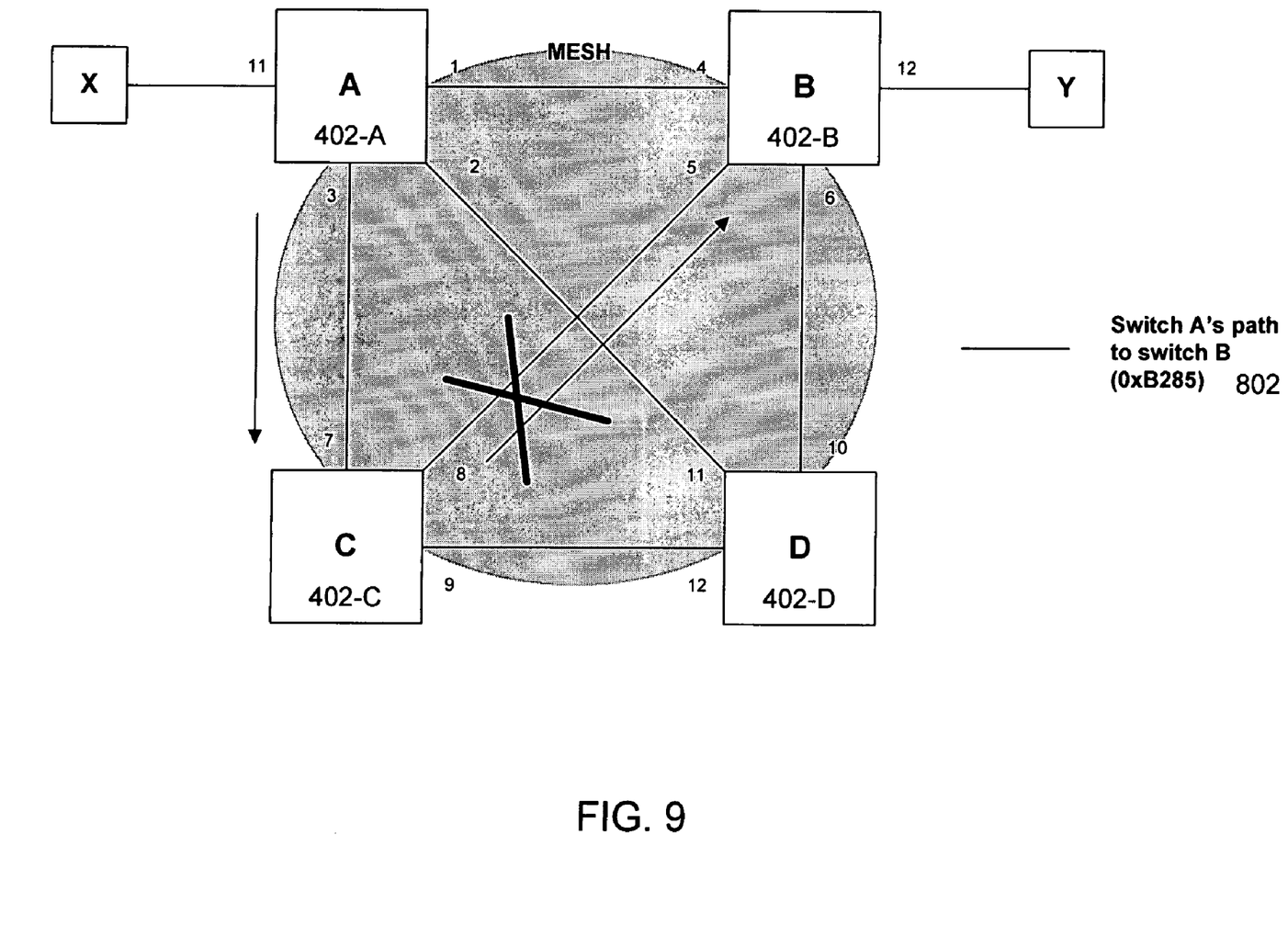
Figure 10:
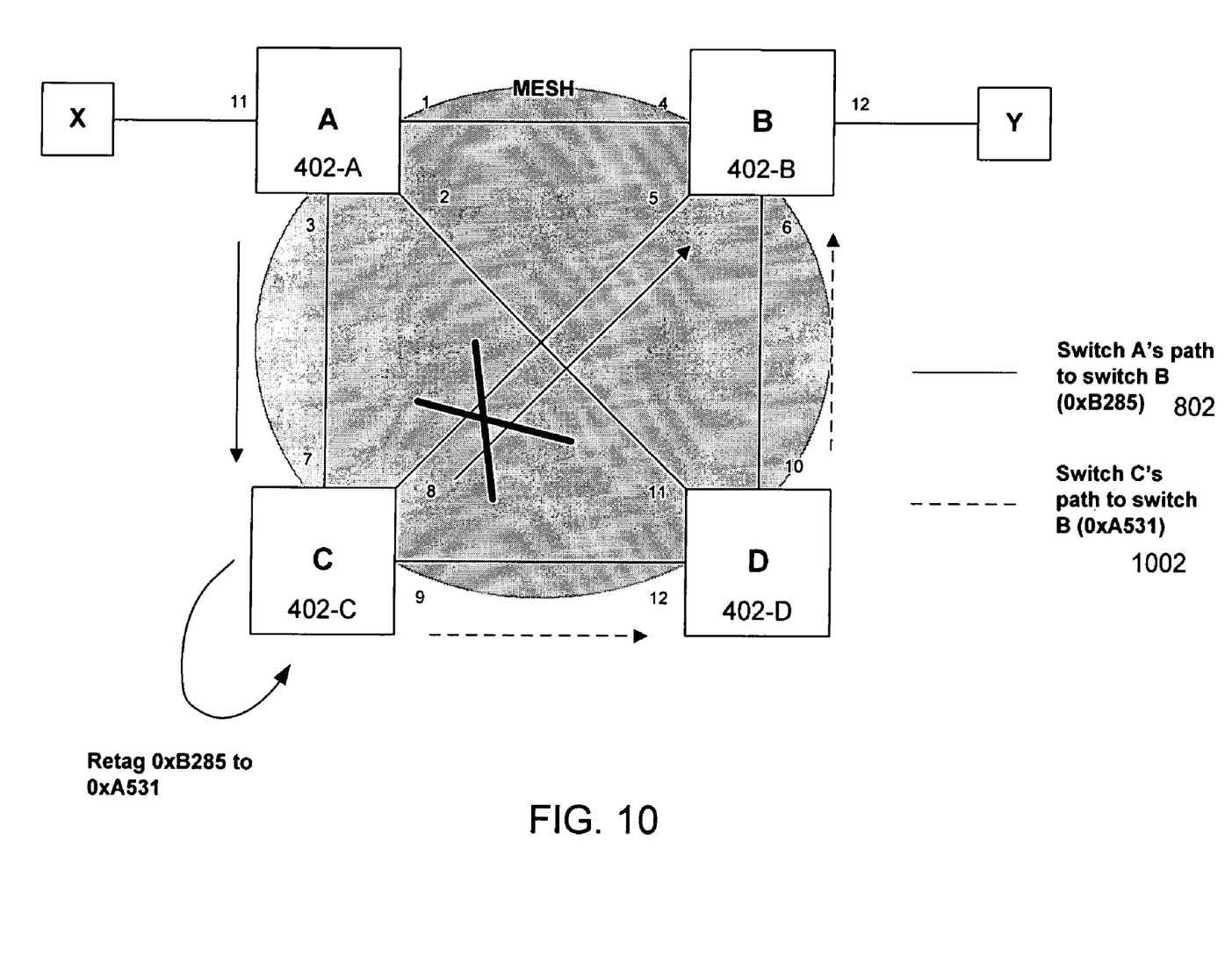

For purposes of illustration, consider the switching mesh and tagged paths depicted in FIGS. 8, 9 and 10. Starting With FIG. 8, let us say that source host X is communicating with destination host Y. The packets from host X enter the switching mesh on non-mesh port 11 of switch A 402-A. A non-mesh port is a port to a link other than a mesh link. Switch A looks up host Y's MAC address in its hardware table and finds that path tag 0xB285 is associated with host Y. Switch A inserts the path tag 0xB285 into the packet and looks at the hardware table to see that port 3 is the exit port associated with that tag. As shown in FIG. 8, the path 802 associated with path tag 0xB285 traverses the switching mesh from switch A 402-A (exiting mesh port 3), to switch C 402-C (exiting mesh port 8), to switch B 402-B. A mesh port is a port to a mesh link, which is established between two mesh switches. There may be other ports between mesh switches that are not mesh ports. When switch B (the destination switch) receives the tagged packet, switch B checks its hardware table and determines that this tag 0xB285 terminates on itself (i.e. terminates at switch B). Hence, switch B strips out the path tag from the packet and forwards the packet (without path tag) on the appropriate non-mesh port (port 12, in this instance).

Switch C 402-C is an intermediate switch along that original path 802 to switch B 402-B (the destination switch). Now consider an example wherein the link between switch C 402-C and switch B 402-B fails. The failure of this link is illustrated in FIG. 9.

When switch C 402-C (the detecting switch) detects 702 that the link coupled to its mesh port 8 has failed, then that switch determines 704 a set of path tags affected by the broken link. This set of path tags exiting port 8 of switch C. For instance, consider the particular path tag 0xB285 for the path going from switch A to switch C to switch B depicted in FIG. 9. This path tag 0xB285 is among those affected by the broken link.

After the affected path tags are determined 704, the detecting switch (for instance, switch C) selects 706 detour path tags. A detour path reaches the same destination as a corresponding path affected by the broken link, but the detour path circumvents the broken link. With the detour path tags selected 706, then when the detecting switch (for instance, switch C) receives 708 packets with path tags affected by the broken link, the detecting switch retags 710 those packets with the corresponding detour path tags and forwards 712 the retagged packets along the detour path. For instance, as shown in FIG. 10, consider that the detour path tag 0xA531 was selected 706 for the corresponding (broken) path tag 0xB285. When switch C receives 708 a packet with path tag 0xB285, switch C removes that path tag and replaces it with the detour path tag 0xA531. In other words, switch C retags 710 the packet with the detour path tag 0xA531. Switch C then forwards 712 the retagged packet out of its port 9 such that the retagged packet follows the detour path 1002 from switch C to switch D to switch B.

Meanwhile, once a link failure is detected 702, the detecting switch (for instance, switch C in the example) also informs 714 the rest of the switching mesh of this link failure. When a mesh switch receives this notification, it will then stop 716 using all path tags that utilized this broken link and instead use 718 alternate path tags. In other words, notified owner switches will begin inserting the alternate path tags, instead of path tags affected by the broken link, into packets being sent across the mesh. Furthermore, after waiting a timeout period, the notified owner switches inform 720 the rest of the mesh to remove those path tags affected by the broken link from their hardware tables. The timeout period should be sufficiently long so as to allow all packets with the old tags (those affected by the broken link) sufficient time to exit the mesh.

In accordance with an embodiment of the invention, after the detecting switch selects 706 the detour path tags, the broken-path tags may be distributed on multiple detour path tags in order to prevent over-subscription of ports. This distribution may be performed in hardware circuitry, for example, by applying a hashing mechanism similar to one used in port-trunking.

In accordance with an embodiment of the invention, the switching mesh is further configured to avoid or reduce sending out-of-order packets. In accordance with this embodiment, when a switch that is currently retagging packets for link failure notifies the other switches about the tags that it is currently retagging for, it adds a latency estimate for the packets it is retagging. The value of the latency estimate may be the same for each tag going to the same edge switch for a tiven priority. This latency information should be available from the cost information that the retagging switch has. The switch that receives the retagged information could estimate the difference in latency for the retagged path (retagged estimate plus latency to the retagging switch) and the new path that it intends to use. This difference may typically be very small but could be used by the receiving switch to determine how long is the time period from the moment it stops using the old path, to the moment it starts using the new path. The packets during this time period could be dropped. Or, if hardware permits, the packets during this time period may be queued. Such queueing may require a special queue that waits until the hardware is programmed to forward. If the queue is full, then additional packets during this time period would be dropped.

Note that while the specific instance discussed above involves retagging packets from a single owner switch, packets from more than one owner switch may be retagged to the detour path or paths.

As discussed above, the conventional method of handling link failures is a relatively long, drawn out process, involves several switches, and may take several seconds to build and assign alternate paths. In contrast, the invented technique is a typically faster process, primarily involves a single is switch, and may take less than one second to provide a detour by retagging.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of handling a failed link between switches, the method comprising:
   detecting the failed link at a detecting switch;
   determining a set of path tags whose paths are affected by the failed link;
   receiving a packet with one of the path tags affected by the failed link;
   retagging the packet with a detour path tag associated with a detour path circumventing the failed link;
   after determining the set of path tags whose paths are affected by the failed link, selecting multiple detour path tags associated with detour paths circumventing the failed link; and
   distributing the path tags affected by the failed link over the multiple detour path tags in order to prevent over-subscription of ports.

2. The method of claim 1, further comprising:
   notifying other switches of the failed link.

3. The method of claim 2, wherein a switch receiving notification of the failed link stops using path tags associated with paths crossing the failed link and uses alternate path tags associated with paths avoiding the failed link.

4. The method of claim 3, wherein, after a timeout period, the path tags affected by the failed link are removed from hardware tables in the switches.

5. The method of claim 4, wherein the switches form a switching mesh.

6. The method of claim 5, wherein the timeout period is sufficiently long so as to allow packets with the affected path tags sufficient time to exit the switching mesh.

7. The method of claim 1, wherein each path tag comprises a source switch identifier, a destination switch identifier, and a path identifier.

8. The method of claim 1, wherein the distribution of the path tags is performed using a hash mechanism.

9. A packet switch apparatus with link failure handling capability for use in a switching mesh, the apparatus including:
   a plurality of ports; and
   a switch controller coupled to the plurality of ports, wherein the switch controller is configured to use procedures stored in memory to detect a failed link at a detecting switch, determine a set of path tags whose paths are affected by the failed link, receive a packet with one of the path tags affected by the failed link, and retag the packet with a detour path tag associated with a detour path circumventing the failed link, wherein the switch controller is further configured to select multiple detour path tags associated with detour paths circumventing the failed link and to distribute the path tags affected by the failed link over the multiple detour path tags in order to prevent over-subscription of ports.

10. The apparatus of claim 9, wherein the procedures stored in memory for use by the switch controller include a procedure to notifying other switches in the switching mesh of the failed link.

11. The apparatus of claim 10, wherein the procedures stored in memory for use by the switch controller include a procedure for owner switches to stop using path tags associated with paths crossing the failed link and to use alternate path tags associated with paths avoiding the failed link.

12. The apparatus of claim 11, wherein the procedures stored in memory for use by the switch controller include a procedure for the path tags affected by the failed link to be removed from a hardware table after a timeout period.

13. The apparatus of claim 12, wherein the timeout period is sufficiently long so as to allow packets with the affected path tags sufficient time to exit the switching mesh.

14. The apparatus of claim 9, wherein each path tag comprises a source switch identifier, a destination switch identifier, and a path identifier.

15. A switching mesh including a capability to handle link failures, wherein each switch in the mesh is configured to detect a failed link at a detecting switch, determine a set of path tags whose paths are affected by the failed link, receive a packet with one of the path tags affected by the failed link, and retag the packet with a detour path tag associated with a detour path circumventing the failed link, wherein each switch in the mesh is further configured to select multiple detour path tags associated with detour paths circumventing the failed link and to distribute the path tags affected by the failed link over the multiple detour path tags.

16. The switching mesh of claim 15, wherein each switch is further configured to notify other switches in the switching mesh of the failed link.

17. The switching mesh of claim 16, wherein each switch is further configured to stop using path tags associated with paths crossing the failed link and to use alternate path tags associated with paths avoiding the failed link.

18. The switching mesh of claim 17, wherein each switch is further configured for the path tags affected by the failed link to be removed from a hardware table after a timeout period.

19. The switching mesh of claim 18, wherein the timeout period is sufficiently long so as to allow packets with the affected path tags sufficient time to exit the switching mesh.

20. The switching mesh of claim 19, wherein each path tag comprises a source switch identifier, a destination switch identifier, and a path identifier.

21. The switching mesh of claim 17, wherein the switching mesh includes latency estimation information about said retagging that is used to delay using the alternate path to prevent sending out-of-order packets.

22. A system for handling a failed link between switches, the system comprising:

means for detecting the failed link at a detecting switch;

means for determining a set of path tags whose paths are affected by the failed link;

means for receiving a packet with one of the path tags affected by the failed link;

means for retagging the packet with a detour path tag associated with a detour path circumventing the failed link;

means for selecting multiple detour path tags associated with detour paths circumventing the failed link; and     means for distributing the path tags affected by the failed link over the multiple detour path tags in order to prevent over-subscription of ports.

\* \* \* \* \*